United States Patent

Ichikawa et al.

[11] Patent Number: 5,813,874
[45] Date of Patent: Sep. 29, 1998

[54] RELAY APPARATUS FOR RELATIVELY ROTATABLE MEMBERS

[75] Inventors: Hidehiro Ichikawa; Hiraku Tanaka; Akihisa Kawamura, all of Shizuoka-ken, Japan

[73] Assignee: Yazaki Corporation, Tokyo, Japan

[21] Appl. No.: 747,608

[22] Filed: Nov. 13, 1996

[30] Foreign Application Priority Data

Nov. 20, 1995 [JP] Japan .................................. 7-301472

[51] Int. Cl.$^6$ .................................................. H01R 35/04
[52] U.S. Cl. .............................................. 439/164; 439/15
[58] Field of Search ........................................ 439/164, 15

[56] References Cited

U.S. PATENT DOCUMENTS

| | | | |
|---|---|---|---|
| 5,529,505 | 6/1996 | Kuramoto et al. | 439/164 |
| 5,647,753 | 7/1997 | Ishikawa et al. | 439/164 |
| 5,655,919 | 8/1997 | Ishikawa et al. | 439/164 |

FOREIGN PATENT DOCUMENTS 6-338371  12/1994  Japan .

*Primary Examiner*—Gary F. Paumen
*Attorney, Agent, or Firm*—Finnegan, Henderson, Farabow, Garrett & Dunner, L.L.P.

[57] ABSTRACT

A relay apparatus between relative rotary members comprises a first rotator (a rotator) 11 having an inner cylindrical portion, a second rotator (a fixed body) having an outer cylindrical portion for surrounding the inner cylindrical portion at a predetermined interval, and relatively rotating to the inner cylindrical portion, a flexible flat cable (a cable) coiled along an inside of a circular space K between the inner cylindrical portion and the outer cylindrical portion, an upper cover having an aperture at a center portion, installed in the outer cylindrical portion in order to cover an upper side of the circular space, and an outer leading cover installed on the upper cover for rotating flexibly, and coupled to the first rotator through the aperture for leading the flexible flat cable outward. The outer leading cover has a circular rib A connected to the upper cover on its outer circumferential portion, whose diameter of an outer circumference is shorter than that of the upper cover.

2 Claims, 3 Drawing Sheets

RELAY APPARATUS FOR RELATIVELY ROTATABLE MEMBERS

BACKGROUND OF THE INVENTION

1. Field of the invention

The invention relates to a relay apparatus for relatively rotatable members electrically connected through a cable.

2. Description of the Related Art

According to a conventional relay apparatus for relatively rotatable members, a diameter of an outer circumference of an outer leading cover has the same length as that of an upper cover. Accordingly, a circumferential side of the upper cover, which does not rotate, is arranged next to a rotating outer leading cover. As a result, the outer leading cover brings in a foreign substance existing at the outer circumference. Additionally, if any other component is arranged in contact with the circumferential side of the upper cover, the component also contacts the outer leading cover. Consequently, it is necessary to arrange such a component away from the circumferential side of the upper cover. Accordingly, a space surrounding the conventional relay cannot be used effectively.

SUMMARY OF THE INVENTION

It is an object of the present invention to provide a relay apparatus for relatively rotatable members, in which foreign substances at an outer circumferential side are not brought by the outer leading cover and other component can be arranged next to the circumferential side of the upper cover, enabling to use a surrounding space effectively.

According to one aspect of the invention, a relay apparatus for relatively rotatable members comprises a first rotator having an inner cylindrical portion and a second rotator having an outer cylindrical portion surrounding the inner cylindrical portion with a predetermined interval and being rotatable relative to the inner cylindrical portion. A flexible flat cable is coiled in an inside of a circular space between the inner cylindrical portion and the outer cylindrical portion. An upper cover has an aperture at a center portion thereof and it is placed over the outer cylindrical portion in order to cover an upper side of the circular space. An outer leading cover is rotatably arranged on the upper cover. The outer leading cover has a diameter smaller than a diameter of the upper cover and is coupled to the first rotator through the aperture for leading the flexible flat cable outward. The outer leading cover has a first circular rib formed along an outer circumference thereof. The first circular rib is in contact with the upper cover.

According to another aspect of the invention, preferably, a relay apparatus for relatively rotatable members comprises the upper cover having a second circular rib formed along the aperture and positioned radially inside of the first circular rib of the outer leading cover.

According to the present invention as described above, when a second rotator side is installed fixedly, only a first rotator is rotatable. Accordingly, a circumferential side of the upper cover remains fixed, while a circumferential side of the outer leading cover rotates. However, since a diameter of the outer circumference of the outer leading cover is shorter than that of the upper cover, a foreign substance existing at an outer circumferential side is not brought in by the outer leading cover. Furthermore, even if a component is arranged next to the circumferential side of the upper cover, the component will not contact the outer leading cover. Since any other components can be arranged next to the circumferential side of the upper cover, a surrounding space can be used effectively.

Since the first circular rib being in contact with the upper cover is installed at an outer circumferential portion of the outer leading cover, it is possible to prevent a dust and other foreign substances from entering through the outer leading cover. Furthermore, the first circular rib enhances rigidity of the outer leading cover. Moreover, since the outer diameter of the outer leading cover is smaller than that of the upper cover, it is possible to enhance the rigidity of the outer leading cover. Additionally, since a rotational speed of the first circular rib of the outer leading cover which slides on the upper cover is lowered by the reduced outer diameter of the outer leading cover, it is possible to reduce frictional abrasion of the first circular rib of the outer leading cover in comparison with that of an outer leasing cover having an outer diameter substantially equal to the outer diameter of the upper cover.

According to the present invention, the second circular rib, engaged in the first circular rib of the outer leading cover, can be installed on the upper cover. The second circular rib enables more effective prevention of a dust and other foreign substances from entering through the outer leading cover. Furthermore, the second circular rib further enhances a rigidity of the upper cover. In addition, since the second circular rib can guide the first circular rib, it is possible to achieve a stable rotation of the outer leading cover.

DETAILED DESCRIPTION OF THE PREFERRED EMBODIMENTS

Figure 1:
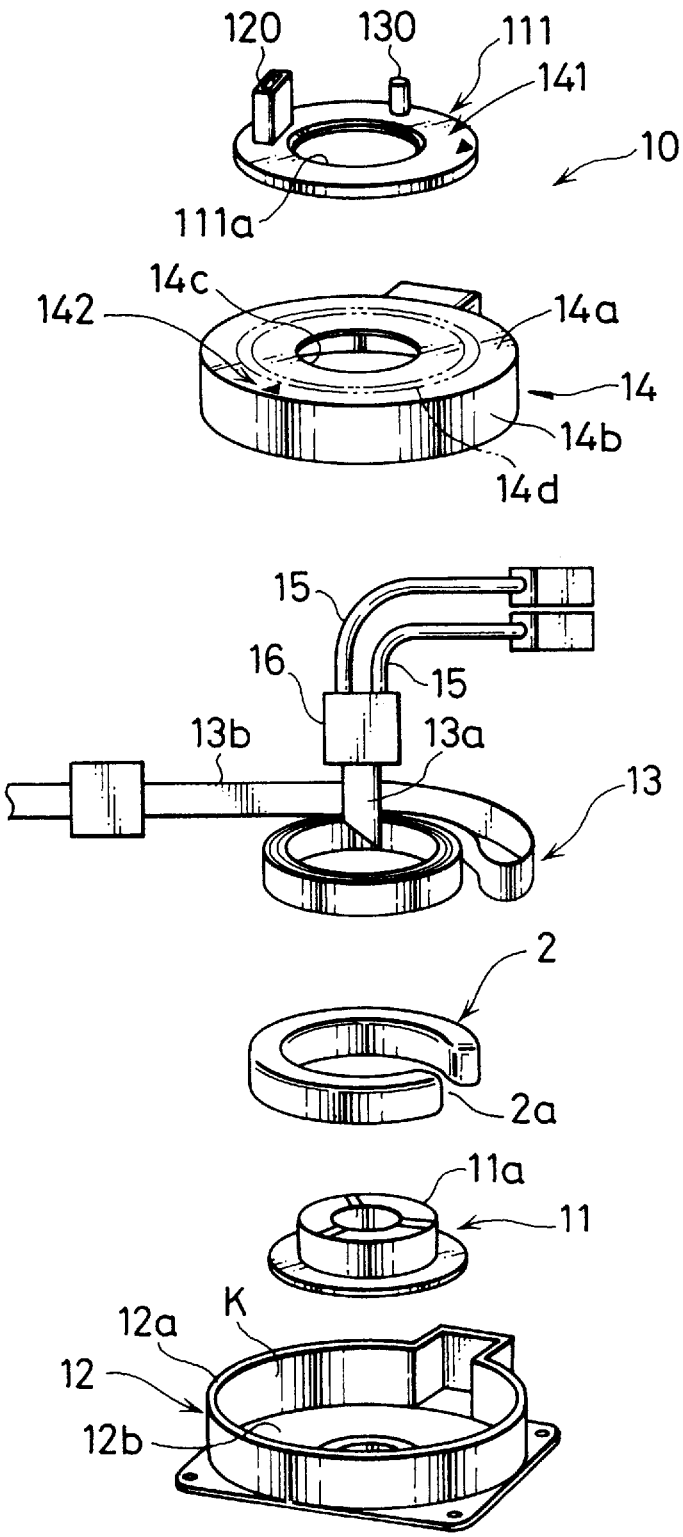
FIG. 1 shows an exploded perspective view of a relay apparatus for relatively rotatable members according to the first embodiment of the present invention.
Figure 2:
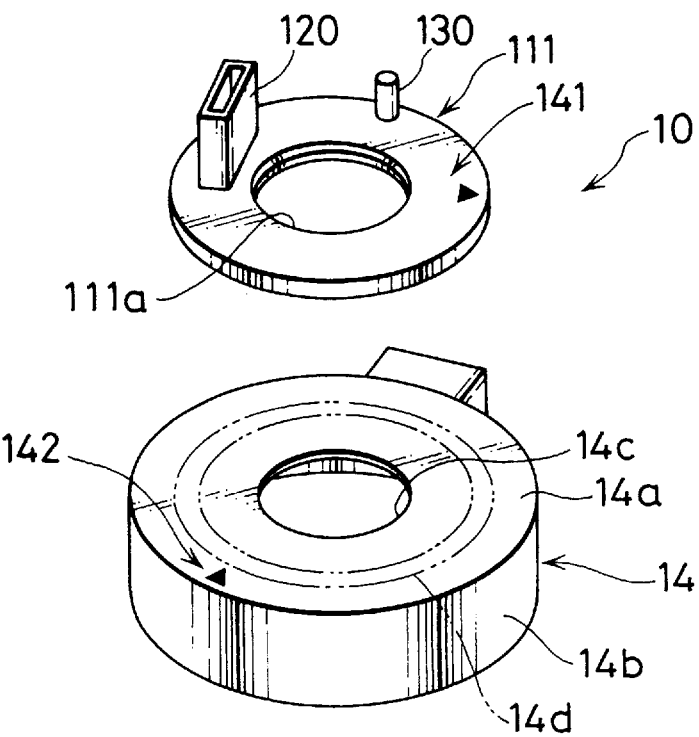
FIG. 2 shows an exploded perspective view of a portion of a relay apparatus for relatively rotatable members according to the first embodiment of the present invention.
Figure 3:
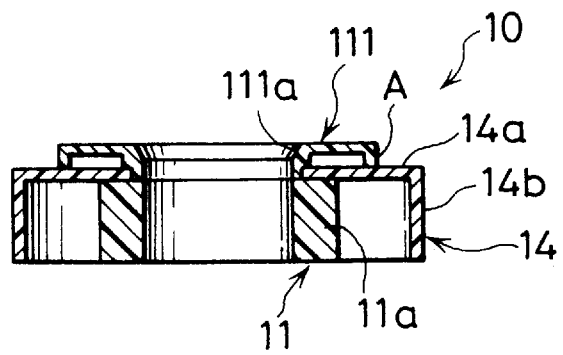
FIG. 3 shows a cross-sectional view of the assembled portion of the relay apparatus for relatively rotatable members in FIG. 3.
Figure 4:
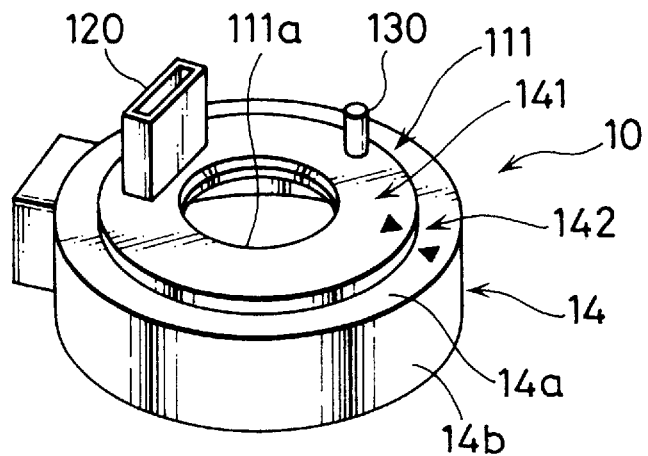
FIG. 4 shows an exploded perspective view of a portion of a relay apparatus for relatively rotatable members according to the second embodiment of the present invention.
Figure 5:
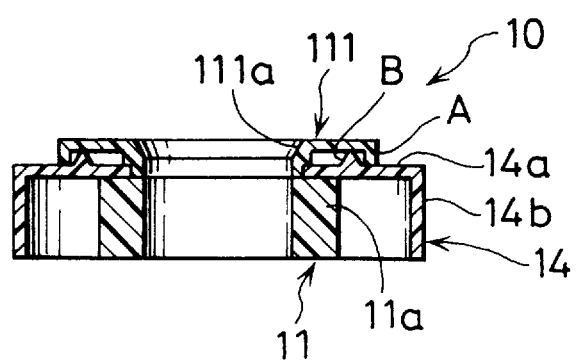
FIG. 5 shows a cross-sectional view of the portion of the relay apparatus for relatively rotatable members in FIG. 4.

Preferred embodiments of the present invention will be described with respect to FIG. 1–FIG. 5 hereinafter. FIG. 1, FIG. 2 and FIG. 3 show the first embodiment. FIG. 4 and FIG. 5 show the second embodiment.

Embodiment 1

As shown in FIG. 1, a relay apparatus for relatively rotatable members 10 comprises a rotator (a first rotator) 11 having an inner cylindrical portion 11a, a fixed body (a second rotator) 12 having an outer cylindrical portion 12a which surrounds the inner cylindrical portion 11a with a predetermined interval, a cable (a flexible flat cable) 13 coiled in an inside of a circular space K between the inner cylindrical portion 11a and the outer cylindrical portion 12a. A terminal portion of an inner circumference 13a of the cable 13 and a terminal portion of an outer circumference 13b of the cable 13 are held the an inner cylindrical portion 11a and the outer cylindrical portion 12a, respectively. A C-shaped mobile body 2 is installed in the space K and moves smoothly so that the direction of the cable 13 can be reversed at an aperture 2a.

A fixed body 12 is covered with a cover member 14 so that an upper side of the space K and a circumference of the outer cylindrical portion 12a are surrounded. The cover member 14 comprises an upper cover 14a, which covers at the upper of the space K, and a cylindrical portion 14b, which surrounds a circumference of the outer cylindrical portion 12a. Therefore, the cover member 14 can not rotate relative to the fixed body 12. An aperture 14c is located at a center portion of the upper cover 14a. The fixed body 12 has a lower cover 12b for covering a lower side of the space K and the lower cover 12b is formed integrally with the outer cylindrical portion 12a.

Furthermore, an outer leading cover 111 is installed over an upper of the cover member 14, and leads the cable 13 outwardly, so that the outer leading cover 111 can rotate freely. The outer leading cover 111 is coupled with the inner cylindrical portion 11a through the aperture 14c of the cover member 14 and holds a connecting portion 16 between the terminal portion of an inner circumference 13a of the cable 13 and an outer cable 15. Furthermore, the outer leading cover 111 comprises a holding means 120 for holding the connecting portion 16 and a driving pin 130 for driving the rotation. The rotator 11 is coupled to, for example, a steering wheel in a handle portion of a car. The fixed body 12 is fixed at a side of a steering column.

As shown in FIG. 2, the outer leading cover 111 comprises a disk-shaped member having a circular aperture 111a at a center. The diameter of the outer circumference is shorter than that of the upper cover 14a. The upper leading cover 111 preferably has the shortest possible diameter of the outer circumference allowing the installation of the holding means 120 and the driving pin 130. Accordingly, the outer circumferential portion of the outer leading cover 111 can be located further inside of the upper cover 14a.

The outer leading cover 111 comprises a circular rib A located along the outer circumferential portion of the outer leading cover 111, and the rib A is in contact with the upper cover 14a when assembled. The aperture 111a of the outer leading cover 111 has a rib in order to contact with the upper cover 14a. A rib-shaped terminal portion of the outer leading cover 111 is coupled with the inner cylindrical portion 11a of the rotator (a first rotator) 11.

A first setting mark 141 can be on the outer leading cover 111 in order to set a reference position. A second setting mark 142 can be on the upper cover 14a.

The relay apparatus for relatively rotatable members as described above can be operated as follows. At a position where a clockwise rotation is completed, the outer leading cover 111 is rotated counterclockwise for predetermined times of rotation so that a first setting mark 141 can be set to a second setting mark 142. Thus, a reference position between a clockwise rotation direction and a counterclockwise rotation direction can be set on the outer leading cover 111.

A fixed body 12 is fixed at a side of a steering column of a steering wheel portion of a car. A rotator 11 is coupled to a steering wheel through the driving pin 130. Therefore, the outer leading cover 111 rotates as turning the steering wheel. A steering column side is connected electrically to the steering wheel through the cable 13.

According to a relay apparatus for relatively rotatable members of the invention, a fixed body 12 side is arranged fixedly and the circumferential side of the upper cover 14a, that is, the circumferential side of the cylindrical portion 14b remains fixed, while the circumferential side of the outer leading cover 111 can be rotated. However, since the outer circumferential diameter of the outer leading cover 111 is shorter that of the upper cover 14a, a foreign substance existing at the outer circumference of the cylindrical portion 14b are not brought in by the outer leading cover 111.

Moreover, even if other components are arranged next to the circumferential side of the upper cover 14a, the components are not contacted with the upper leading cover 111. Accordingly, since it is possible to arrange other components next to the circumferential side of the upper cover 14a, a surrounding space can be used effectively.

Since the circular rib A (a first circular rib), which contacts the upper cover 14a, is located at the outer circumferential portion of the outer leading cover 111, it is possible to prevent a dust and other foreign substances from entering into the outer leading cover 111. Furthermore, the circular rib A enhances a rigidity of the outer leading cover 111. Preferably, the outer circumferential diameter of the outer leading cover 111 is as small as possible for the installation of the holding means 120 and the driving pin 130. Thus, it is possible to enhance a rigidity of the outer leading cover 111. Additionally, since the diameter of the outer circumference of the outer leading cover 111 is minimum, it is possible to lower a sleeving speed when the circular rib A sleeves on the upper cover 14a. As a result, abrasion of the sleeving portion 14d due to the circular rib A of the outer leading cover 111 and the upper cover 14a is reduced.

Moreover, since the outer circumferential diameter of the outer leading cover 111 is shorter than that of the upper cover 14a, the second setting mark 142 can be set on the upper cover 14a. Thus, the first setting mark 141 on the outer leading cover 111 can be set onto the second setting mark 142 on the upper cover 14a easily, obtaining a reference position of the outer leading cover 111.

Embodiment 2

Next, the second embodiment of the present invention will be described with respect to FIG. 4 and FIG. 5 hereinafter. Whenever possible, the same reference numbers as for the first embodiment (FIG. 1, FIG. 2 and FIG. 3) are used for the second embodiment (FIG. 4 and FIG. 5). Thus, the explanations of the similar elements are simplified. The second embodiment differs from the first embodiment in that the second embodiment has a circular rib B (a second circular rib) is located on the upper cover 14a. The upper cover 14a comprises a circular rib B formed along the aperture 111a. As shown in FIG. 5, the circular rib B of the upper cover 14 is in contact with a portion of the outer leading cover 111. The portion is positioned radially inside of the circular rib A of the outer leading cover 111.

According to the relay apparatus for relatively rotatable members 10, the circular rib B is located on the upper cover 14a. The circular rib B enables more effective prevention of a dust and other foreign substances from entering into the outer leading cover 111. Also, it enhances the rigidity of the upper cover 14a. In addition, since the circular rib B guides along the circular rib A, it is possible to achieve a stable rotation of the outer leading cover 111.

The second embodiment of the present invention is constructed so that the circular rib B is located inside of the circular rib A. However, the circular rib B may also be located outside of the circular rib A. In this case, preferably, a height of the circular rib B may reach the upper side of the outer leading cover 111. Consequently, it is possible not only to enhance further effect of preventing a dust, but also to reduce the exposed area of the rotating portion by the outer leading cover 111.

What is claimed is:

1. A relay apparatus for relatively rotatable members, said relay apparatus comprising:

a first rotator having an inner cylindrical portion;

a second rotator having an outer cylindrical portion surrounding said inner cylindrical portion with a predetermined space interval, and being rotatable relative to said inner cylindrical portion;

a flexible flat cable coiled inside a circular space between said inner cylindrical portion and said outer cylindrical portion;

an upper cover having an aperture at a center portion thereof, said upper cover placed over said outer cylindrical portion in order to cover an upper side of said circular space; and an outer leading cover rotatably arranged on said upper cover, said outer leading cover having a diameter smaller than a diameter of said upper cover and being coupled to said first rotator through said aperture for leading said flexible flat cable outward, said outer leading cover having a first circular rib formed along an outer circumference thereof, said first circular rib being in contact with said upper cover.

2. The relay apparatus according to claim 1, wherein said upper cover has a second circular rib formed along said aperture, said second circular rib being in contact with a portion of said outer leading cover, said portion being positioned radially inside of said first circular rib of said outer leading cover.

* * * * *

UNITED STATES PATENT AND TRADEMARK OFFICE
CERTIFICATE OF CORRECTION

PATENT NO. : 5,813,874
DATED : September 29, 1998
INVENTOR(S) : ICHIKAWA et al.

It is certified that error appears in the above-identified patent and that said Letters Patent is hereby corrected as shown below:

Title Page, Item [57], in the Abstract,
line 1, "between relative rotary" should read --for relatively rotatable--;
line 2, before "having", delete "11";
line 5, "at" should read --with--, and "relatively rotating" should read --being rotatable relative--;
line 7, "along" should read --in--, and after "space", delete "K";
line 12, "rotating flexibly" should read --being freely rotatable--; and
line 15, after "rib", delete "A".

Signed and Sealed this

Eleventh Day of January, 2000

Q. TODD DICKINSON

Attest:

Attesting Officer       Acting Commissioner of Patents and Trademarks